United States Patent [19]

Phillips

[11] 3,859,296

[45] Jan. 7, 1975

[54] CERTAIN 3-SUBSTITUTED-N-ALKYL-1,2,4-THIADIAZOLE-5-CARBOXANILIDES

[75] Inventor: Wendell Gary Phillips, Olivette, Mo.

[73] Assignee: Monsanto Company, St. Louis, Mo.

[22] Filed: Mar. 29, 1973

[21] Appl. No.: 346,363

Related U.S. Application Data

[62] Division of Ser. No. 158,995, July 1, 1971, Pat. No. 3,770,749.

[52] U.S. Cl. ................................. 260/302 D
[51] Int. Cl. ................................. C07d 91/32
[58] Field of Search ....................... 260/302 D

[56] References Cited

UNITED STATES PATENTS

| | | | |
|---|---|---|---|
| 3,573,317 | 3/1971 | Smith | 260/302 D |
| 3,770,749 | 11/1973 | Phillips | 260/302 D |

OTHER PUBLICATIONS

Gogrdgler et al., Chem. Abstracts, 60, 6836–7 (1964).

*Primary Examiner*—R. J. Gallagher
*Attorney, Agent, or Firm*—William T. Black

[57] ABSTRACT

3,5-Substituted-1,2,4-thiadiazoles are produced by the reaction of organic amidine hydrochlorides and sulfenyl chlorides in the presence of a base. These 3,5-substituted-1,2,4-thiadiazoles are useful as herbicides.

3 Claims, No Drawings

CERTAIN 3-SUBSTITUTED-N-ALKYL-1,2,4-THIADIAZOLE-5-CARBOXANILIDES

This application is a division of co-pending application Ser. No. 158,995, filed July 1, 1971, now U.S. Pat. No. 3,770,749.

This invention relates to novel 3,5-substituted-1,2,4-thiadiazoles which are useful as herbicides. These 3,5-substituted-1,2,4-thiadiazoles are produced by the reaction of organic amidine hydrochlorides and sulfenyl chlorides in the presence of a base.

The novel 3,5-substituted-1,2,4-thiadiazoles of this invention are those represented by the formula

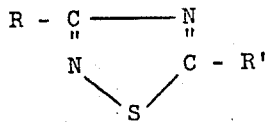

wherein R is an alkyl group containing from 1 to 8 carbon atoms, inclusive, a haloalkyl group containing from 1 to 8 carbon atoms and from 1 to 3 halogen atoms, aryl containing from 6 to 12 carbon atoms or haloaryl containing from 6 to 12 carbon atoms and from 1 to 5 halogen substituents or a heterocyclic group and R' is

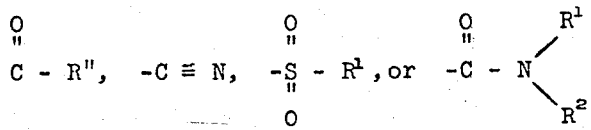

wherein R'' is alkyl of from 1 to 8 carbon atoms, alkoxyl of 1 to 8 carbon atoms, aryl of 6 to 12 carbon atoms, or aralyloxy of 6 to 12 carbon atoms. $R^1$ and $R^2$ are alkyl or aryl groups as defined for R and R''.

Illustrative of the alkyl groups represented by R, R'', $R^1$ and $R^2$ are, for example, methyl, ethyl, propyl, isopropyl, butyl, secondary butyl, cyclohexyl, methylcyclohexyl, dimethylcyclohexyl, heptyl and octyl. Illustrative of the aryl groups represented by R, R'', $R^1$ and $R^2$ are, for example, phenyl, tolyl, xylyl, naphthyl mesityl, cumyl and the like. Illustrative of the alkoxy and aryloxy groups represented by R'' are, for example, methoxy, ethoxy, propoxy, isopropoxy, cyclohexyloxy, methyl cyclohexyloxy, octyloxy and the like; phenoxy, tolyloxy, xylyloxy, naphthoxy, mesityloxy, cumyloxy and the like.

By the term "halogen" as employed herein is meant chlorine, bromine, iodine, or fluorine. Illustrative of the halogenated alkyl and aryl groups represented by R and R'' are, for example, chloromethyl, dichloromethyl, trichloromethyl, trichlorobutyl, tribromooctyl, bromophenyl, dibromophenyl, chlorophenyl, trifluoromethylphenyl and the like.

Illustrative of the heterocyclic groups represented by R are, for example, those containing one nitrogen atom in the ring, for example, pyridyl, indolyl, acridinyl, pyrryl, piperidinyl, quinolinyl and the like; those containing one oxygen in the ring, for example, furyl, benzofuryl, pyranyl, xanthyl and the like; those containing two nitrogen atoms in the ring, for example, indazyl, pyrimidyl, pyrazyl, cinnolinyl, quinazolyl, phenazinyl, pyrazolyl and the like; those containing two oxygen atoms in the ring, for example, para-dioxin and the like; and those containing one oxygen atom and one nitrogen atom in the ring, for example, 1,4-oxazinyl, benzoxazinyl, benzisoazolyl, oxazolyl, isooxazolyl and the like. Such heterocyclic groups also include those that contain a single heterocyclic ring such as furyl, pyrryl, pyridyl and the like as well as those containing fused rings such as, for example, 1,2-benzopyranyl, indazyl, indolyl, naphthyridinyl, pyrido(3-2-b)-pyridinyl, carbazyl, acridinyl, quinolinyl and the like.

The compositions of the present invention are produced by reacting an organic amidine hydrochloride of the formula

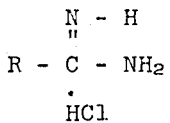

wherein R has the above-defined meaning with a sulfenyl chloride of the formula

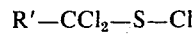

wherein R' is as above-defined in the presence of an inert solvent and a base.

In conducting the process of the present invention, the ratio of the starting materials is not narrowly critical and can be varied over a wide range. It is of course preferred to keep the ratio of reactants, that is, the sulfenyl chloride and the organic amidine hydrochloride at approximately equimolar ratios inasmuch as an excess of the one or other reagent renders the separation of the products more difficult.

The temperature at which the reaction is conducted is not narrowly critical and can vary from −20° to as high as 20°C. It is preferred for convenience to carry out the reaction at a temperature of about −5° to +5°C.

The process of the present invention is preferably carried out in a suitable solvent which is non-reactive with either the reagents or the product produced. It is not necessary that either the reagents or the products be soluble in the solvent but the reaction can take place in a slurried medium. Solvents or diluents which can by employed in the process of this invention are the chlorinated aliphatic hydrocarbons such as methylene chloride, chloroform, methyl chloride, carbon tetrachloride, tetrachloroethylene and the hydrocarbon solvents such as benzene, toluene, xylene and the like, care being taken that the solvent or diluents employed does not solidify under the temperature conditions employed.

A basic material is necessary to conduct the process of the instant invention. Such bases which can be employed are, for example, sodium hydroxide, potassium hydroxide, lithium hydroxide, and the like. The base serves to react with the hydrogen chloride liberated by the reaction and drive the reaction to completion. Although the amount of base employed in the process of the instant invention is not narrowly critical, it is obvious that for completeness of reaction that one should employ at least 1 equivalent of base for each equivalent of hydrogen chloride liberated by the reaction. It is preferred to employ an excess of base over that required by the stoichiometry of the reaction for best results and ease of isolation of the product. The base is normally added as a water solution giving rise to a two-phase system. The amount of water employed is sufficient to dissolve the base and can vary over a wide range.

The starting sulfenyl chloride employed in the process of this invention are prepared in accordance with the processes in copending applications Ser. Nos. 139,976 and 139,978, both filed May 3, 1971, now U.S. Patents Nos. 3,770,824 and 3,792,088, respectively, which applications are incorporated herein by reference thereto.

The compositions of the present invention find use as herbicides and phytotoxicants.

The following examples serve to further illustrate the invention. All parts are parts by weight unless otherwise expressly set forth.

EXAMPLE 1

2-pyridyl amidine hydrochloride (18.6 g, 0.05 mole) was charged into a suitable reaction vessel and sufficient methylene chloride added to produce a slurry. A solution of (N-phenyl-N-isopropylcarbamoyl)-dichloromethyl sulfenyl chloride dissolved in methylene chloride was then added and the mixture cooled to −5°C. A sodium hydroxide solution (50% solution in water, 0.25 mole) was added dropwise over a three hour period while maintaining the reaction temperature below about −5°C. The reaction mixture was then allowed to stand overnight and the precipitated sodium chloride removed by filtration. The filtrate was washed 3 times with water and the methylene chloride removed by vacuum evaporation to yield a dark tarry residue, petroleum ether was added and the dark tarry residue extracted with the petroleum ether with heating. The petroleum ether solution was decanted and cooled to give 3(2-pyridinyl)-5-(N-isopropylanilino)-1,2,4-thiadiazole as a crystalline precipitate, m.p. 102°–107°C which gave the following analysis.

Calc'd for $C_{17}H_{18}N_4OS$: C, 62.94; H, 4.97; N, 17.27
Found: C, 62.81; H, 5.05; N, 17.37

EXAMPLE 2

Following the procedure of Example 1,(N,N-diisopropylcarbamoyl)-dichloromethyl sulfenyl chloride, was reacted with 2-pyridyl amidine hydrochloride in the presence of sodium hydroxide to yield 3(2-pyridinyl)-5-N,N-diisopropylcarbamoyl-(1,2,4-thiadiazole) which when recrystallized from toluene had a melting point of 68° to 72°C. and gave the following analysis:

Calc'd for $C_{14}H_{18}N_4OS$: C, 57.91; H, 6.25
Found: C, 57.91; H, 6.36

EXAMPLE 3

Chloromethyl amidine hydrochloride (12.9 grams, 0.1 mole) suspended in 200 ml of methylenechloride was added to a suitable reaction vessel and a solution of (N-phenyl-N-isopropylcarbamoyldichloromethyl sulfenyl chloride) dissolved in 200 ml of methylenechloride was added and the mixture cooled to −5°C. Aqueous sodium hydroxide (50% solution, 0.5 mole) was added dropwise so that the temperature did not exceed −5°C. The reaction mixture was allowed to stand overnight, and the filtrate extracted with water. The methylene chloride was vacuum evaporated and the residual oil extracted with about 500 ml of hot petroleum ether. The petroleum ether was cooled by means of a dry acetone bath to yield a white solid which was removed by filtration. The white solid appeared to melt at about room temperature and was identified as 3(chloromethyl)-5-N-phenyl-N-isopropylcarbamoyl-1,2,4-thiadiazole.

EXAMPLE 4

Following the procedure of Example 1, parachlorophenyl amidine hydrochloride was reacted with (N-phenyl-N-isopropylcarbamoyl)-dichloromethyl sulfenyl chloride in the presence of sodium hydroxide to yield 3(parachlorophenyl)-5-(N-phenyl-N-isopropylcarbamoyl)-1,2,4-thiadiazole which when recrystallized from petroleum ether had a melting point of 98° to 102°C.

Other compounds included within the scope of this invention can be produced by the methods set forth in the preceding examples are, for example:

3-(3,4-dichlorophenyl)-5-(N-methylanilinocarboxy)-1,2,4-thiadiazole
3-methyl-5-(N-ethylanilinocarboxy)-1,2,4-thiadiazole
3-isopropyl-5-(N-isopropylanilinocarboxy)-1,2,4-thiadiazole
3-(2-chlorophenyl)-5-(N,N-dimethylamidocarboxy)-1,2,4-thiadiazole
3-(2,6-diethylphenyl)-5-(N,N-diisopropylamidocarboxy)-1,2,4-thiadiazole
3-ethyl-5-(N-isopropyl-N-ethylamidocarboxy)-1,2,4-thiadiazole
3-(p-chlorophenyl)-5-cyano-1,2,4-thiadiazole
3-methyl-5-cyano-1,2,4-thiadiazole
3-(2-pyridinyl)-5-cyano-1,2,4-thiadiazole
3-(p-chlorophenyl)-5-(phenylsulfonyl)-1,2,4-thiadiazole
3-(3,4-dibromophenyl)-5-(4-chlorophenylsulfonyl)-1,2,4-thiadiazole
3-methyl-5-(4-methylphenylsulfonyl)-1,2,4-thiadiazole
3-(chloromethyl)-5-(3,4-dichlorophenylsulfonyl)-1,2,4-thiadiazole
3-(1-chloroethyl)-5-(phenacyl)-1,2,4-thiadiazole
3-methyl-5-(4-chlorophenacyl)-1,2,4-thiadiazole
3-(3-tolyl)-5-(4-methylphenacyl)-1,2,4-thiadiazole
3-(4-pyridinyl)-5-(4-methoxyphenacyl)-1,2,4-thiadiazole
3-isopropyl-5-carbethoxy-1,2,4-thiadiazole
3-(t-butyl)-5-carbmethoxy-1,2,4-thiadiazole
3-(3-pyridinyl)-5-carbethoxy-1,2,4-thiadiazole The compounds of the present invention show pre and post-emergent herbicidal activity when applied at a rate of from 2 to 25 pounds per acre on species such as morning glory, Johnson Grass, barnyard grass, lambsquarter and velvet leaf.

In employing the products of this invention as herbicides, the active ingredients that is the product of this invention can be used alone or in combination with a material referred to in the art as an adjuvant in liquid or solid form. Herbicidal formulations are prepared by admixing the ingredient with an adjuvant including diluents, extenders, carriers and conditioning agents to provide compositions in the form of finely-divided particulate solids, granules, pellets, solutions, dispersions or emulsions. Thus, the active ingredient can be used with an adjuvant such as a finely-divided particulate solid, a liquid of organic origin, water, a wetting agent, dispersing agent, an emulsifying agent or any suitable combination of these. The herbicidal formulations usually contain from about 0.01 percent to about 99 percent by weight of active ingredient.

Typical finely-divided solid carriers and inert solid extenders which can be used with the active ingredients include, for example, the talcs, natural and synthetic clays (e.g. kaolinites and attapulgite), pumice, silica, synthetic calcium and magnesium silicates, diatomaceous earth, quartz, Fuller's earth, salt, sulfur, powdered cork, powdered wood, ground corn cobs, walnut flour, chalk, tobacco dust, charcoal, volcanic ash, cottonseed hulls, wheat flour, soybean flour, tripoli and the like. Typical liquid diluents include for example; petroleum fractions such as kerosene, hexane, xylene, benzene, Diesel Oil, toluene, acetone, ethylene dichloride, Stoddard solvent, alcohols such as propanol, glycols and the like.

Herbicidal formulations, particularly liquids and wettable particles, usually contain as a conditioning agent one or more surface-active agents in amounts sufficient to render a given composition readily dispersible in water or in oil. By the term "surface-active agent" it is understood that wetting agents, dispersing agents, suspending agents and emulsifying agents are included therein.

Specific surface-active agents which can be used in the herbicidal formulations of this invention are set out, for example, in Searle U.S. Pat. No. 2,426,417, Todd U.S. Pat. No. 2,655,447, Jones U.S. Pat. No. 2,412,510 and Lenher U.S. Pat. No. 2,139,276. A detailed list of such agents is also set forth by J. W. McCutcheon in "Soap and Chemical Specialties", November, 1947, page 8011 et seq., entitled "Synthetic Detergents"; "Detergents and Emulsifiers - Up to Date" (1960), by J. W. McCutcheon, Inc., and Bulletin E-607 of the Bureau of Entomology and Plant Quarantine of the U.S.-D.A. In general, less than 50 parts by weight of the surface active agent is present per 100 parts by weight of phytotoxic formulation.

Preferred wetting agents are alkyl benzene and alkyl naphthalene sulfonates, sulfated fatty alcohols, amines or acid amides, long chain acid esters of sodium isethionate, esters of sodium sulfosuccinate, sulfated or sulfonated fatty acid esters, petroleum sulfonates, sulfonated vegetable oils, ditertiary acetylinic glycols, polyoxyethylene derivatives of alkylphenols (particularly isooctylphenol and nonylphenyl) and polyoxyethylene derivatives of the mono-higher fatty esters of hexitol anhydrides (e.g. sorbitan). Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium N-methyl-N-(long chain acid) taurates.

Wettable powder formulations usually contain from about 5 to about 95 parts by weight of active ingredient, from about 0.25 to 25 parts by weight of wetting agent, from about 0.25 to 25 parts by weight of dispersant and from 4.5 to about 94.5 parts by weight of inert solid extender, all parts being by weight of the total formulation. Where required from about 0.1 to 2.0 parts by weight of the solid inert extender can be replaced by a corrosion inhibitor or anti-foaming agent or both.

Aqueous suspensions can be prepared by mixing together and grinding an aqueous slurry of water-insoluble active ingredient in the presence of dispersing agents to obtain a concentrated slurry of very finely-divided particles. The resulting concentrated aqueous suspension is characterized by its extremely small particle size, so that when diluted and sprayed coverage is very uniform.

Dusts are dense finely-divided particulate formulations which are intended for application to the soil in dry form. Dusts are characterized by their free-flowing and rapid settling properties so that they are not readily wind-borne to areas where they are of no value. Dusts contain primarily an active ingredient and a dense, free-flowing finely-divided particulate extender. However, their performance is sometimes aided by the inclusion of a wetting agent such as those listed hereinbefore under wettable powder compositions and convenience in manufacture frequently demands the inclusion of an inert, absorptive grinding aid. Suitable classes of grinding aids are natural clays, diatomaceous earth and synthetic minerals derived from silica or silicate. Preferred grinding aids include attapulgite clay, diatomaceous silica, synthetic fine silica and synthetic calcium and magnesium silicates.

The inert finely-divided solid extender for the dusts can be either of vegetable or mineral origin. The solid extenders are characterized by possessing relatively low surface areas and are poor in liquid absorption. Suitable inert solid extenders for herbicidal dusts include micaceous talcs, pyrophyllite, dense kaolin clays, ground calcium phosphate rock and phyllite, dense kaolin clays, ground calcium phosphate rock and tobacco dust. The dusts usually contain from about 0.5 to 95 parts active ingredient, 0 to 50 parts grinding aid, 0 to 50 parts wetting agent and 5 to 99.5 parts dense solid extender, all parts being by weight and based on the total weight of the dust.

The wettable powders described above may also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Emulsifiable oil formulations are usually solutions of active ingredient in water-immiscible or partially water-immiscible solvents together with a surface active agent. Suitable solvents for the active ingredient of this invention include hydrocarbons and water-immiscible ethers, esters or ketones. Suitable surface active agents are anionic, cationic and non-ionic such as alkyl aryl polyethoxy alcohols, polyethylene sorbitol or sorbitan fatty acid esters, polyethylene glycol fatty esters, fatty alkyllol amide condensates, amine salts of fatty alcohol sulfates together with long chain alcohols and oil soluble petroleum sulfonates or mixtures thereof. The emulsifiable oil formulations generally contain from about 5 to 95 parts active ingredient, about 1 to 50 parts surface active agent and about 4 to 94 parts solvent, all parts being by weight based on the total weight of the emulsifiable oil.

Granules are physically stable particulate formulations comprising active ingredient adhering to or distributed through a basic matrix of an inert, finely-divided particulate extender. In order to aid leaching of the active ingredient from the particulate, a surface active agent such as those listed hereinbefore under wettable powders can be present in the composition. Natural clays, pyrophyllites, illite and vermiculite are examples of operable classes of particulate mineral extenders. The preferred extenders are the porous, absorptive, preformed particles such as preformed and screened particulate attapulgite or heat expanded, particulate vermiculite, and the finely-divided clays such as kaolin clays, hydrated attapulgite or bentonitric clays. These extenders are sprayed or blended with the active ingredient to form the herbicidal formulations.

The mineral particles which are used in the herbicidal formulations usually have a size range of 10 to 100 mesh, but preferably such that a large majority of the particles have from 14 to 60 mesh with the optimum size being from 20 to 40 mesh. Clay having substantially all particles between 14 and 80 mesh and at least about 80 percent between 20 and 40 mesh is particularly preferred for use in the herbicidal formulations. The term "mesh" as used herein means U.S. Sieve Series.

The granular herbicidal formulations generally contain from about 5 parts to about 30 parts by weight of active ingredient per 100 parts by weight of clay and 0 to about 5 parts by weight of surface active agent per 100 parts by weight of particulate clay. The preferred granular formulations contain from about 10 parts to about 25 parts by weight of active ingredient per 100 parts by weight of clay.

The herbicidal compositions produced from the products of this invention can also contain other additaments, for example, fertilizers, phytotoxicants, other plant growth regulators, pesticides and the like used as adjuvant or in combination with any of the above-described adjuvants. Chemicals useful in combination with the active ingredients of this invention include for example, ureas, carbamates, acetamides, acetanilides, uracils, acetic acids, phenols, thiolcarbamates, triazoles, benzoic acids, nitriles and the like such as:

3-amino-2,5-dichlorobenzoic acid
3-amino-1,2,4-triazole
2-chloro-N,N-diallylacetamide
2-chloroallyl diethyldithiocarbamate
N'-(4-chlorophenoxy)-phenyl-N,N-dimethylurea
isopropyl M-(3-chlorophenyl)carbamate
2,2-dichloropropionic acid
S-2,3-dichloroallyl N,N-diisopropylthiolcarbamate
2-methoxy-3,6-dichlorobenzoic acid
2,6-dichlorobenzonitrile
6,7-dihydrodipyrido(1,2-a:2',1'-c)-pyrazidiinium salt
3-(3,4-dichlorophenyl)-1,1-dimethylurea
4,6-dinitro-o-sec-butylphenol
2-methyl-4,6-dinitrophenol
ethyl-N,N-dipropylthiolcarbamate
2,3,6-trichlorophenylacetic acid
5-bromo-3-isopropyl-6-methyluracil
3-(3,4-dichlorophenyl)-1-methoxy-1-methylurea
2-methyl-4-chlorophenoxyacetic acid
3-(p-chlorophenyl)-1,1-dimethylurea
1-butyl-3-(3,4-dichlorophenyl)-1-methylurea
N-1-naphthylphthalamic acid
1,1'-dimethyl-4,4'-bipyridinium salt
2,4-dichlorophenyl-4-nitrophenyl ether
α,α,α-trifluoro-2,6-dinitro-N,N-dipropyl-p-toluidine
S-propyl dipropylthiolcarbamate
2,4-dichlorophenoxyacetic acid
2',6'-diethyl-N-methoxymethyl-2-chloroacetanilide Fertilizers useful in combination with the active ingredients include for example ammonium nitrate, urea, potash, and superphosphate. Other useful additaments include materials in which plant organisms take root and grow such as compost, manure, humus, sand and the like.

What is claimed is:

1. A compound of the formula

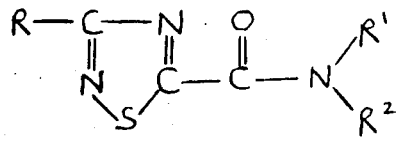

wherein R is an alkyl group containing from 1 to 8 carbon atoms, inclusive, a haloalkyl group containing from 1 to 8 carbon atoms and from 1 to 3 halogen atoms, aryl containing from 6 to 12 carbon atoms or haloaryl containing from 6 to 12 carbon atoms and from 1 to 5 halogen substituents and $R^1$ is an alkyl group containing from 1 to 8 carbon atoms and $R^2$ is phenyl, tolyl, xylyl, naphthyl, mesityl or cumyl.

2. A compound of claim 1 which is 3-(parachlorophenyl)-N-isopropyl-1,2,4-thiadiazole-5-carboxanilide.

3. A compound of claim 1 which is 3-(chloromethyl)-N-isopropyl-1,2,4-thiadiazole-5-carboxanilide.

* * * * *